(No Model.)  2 Sheets—Sheet 1.

H. D. HICKS.
ADDING MACHINE.

No. 528,596. Patented Nov. 6, 1894.

Witnesses:
Cle Bindine
Isaac B. n. Owens

Inventor.
Horace D. Hicks
by
Att'ys (No Model.)   2 Sheets—Sheet 2.

H. D. HICKS.
ADDING MACHINE.

No. 528,596.   Patented Nov. 6, 1894.

Witnesses:   Inventor,
  Horace D. Hicks
  by _____ Attys.

UNITED STATES PATENT OFFICE.

HORACE D. HICKS, OF WHITEFIELD, NEW HAMPSHIRE, ASSIGNOR OF ONE-HALF TO THE BROWN'S LUMBER COMPANY, OF SAME PLACE.

ADDING-MACHINE.

SPECIFICATION forming part of Letters Patent No. 528,596, dated November 6, 1894.

Application filed November 27, 1893. Serial No. 492,160. (No model.)

*To all whom it may concern:*

Be it known that I, HORACE D. HICKS, a citizen of the United States, residing at Whitefield, in the county of Coos and State of New Hampshire, have invented certain new and useful Improvements in Adding-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of adding machines which employ wheels having numbers on the peripheries; and my object is to provide a more simple, and inexpensive device which can be handled and operated with greater ease than those heretofore in vogue. To accomplish these ends, I employ the two co-operating numbered wheels in conjunction with a screw or worm shaft and other peculiar features all of which will be more fully described hereinafter and pointed out in the claims.

Figure 1:
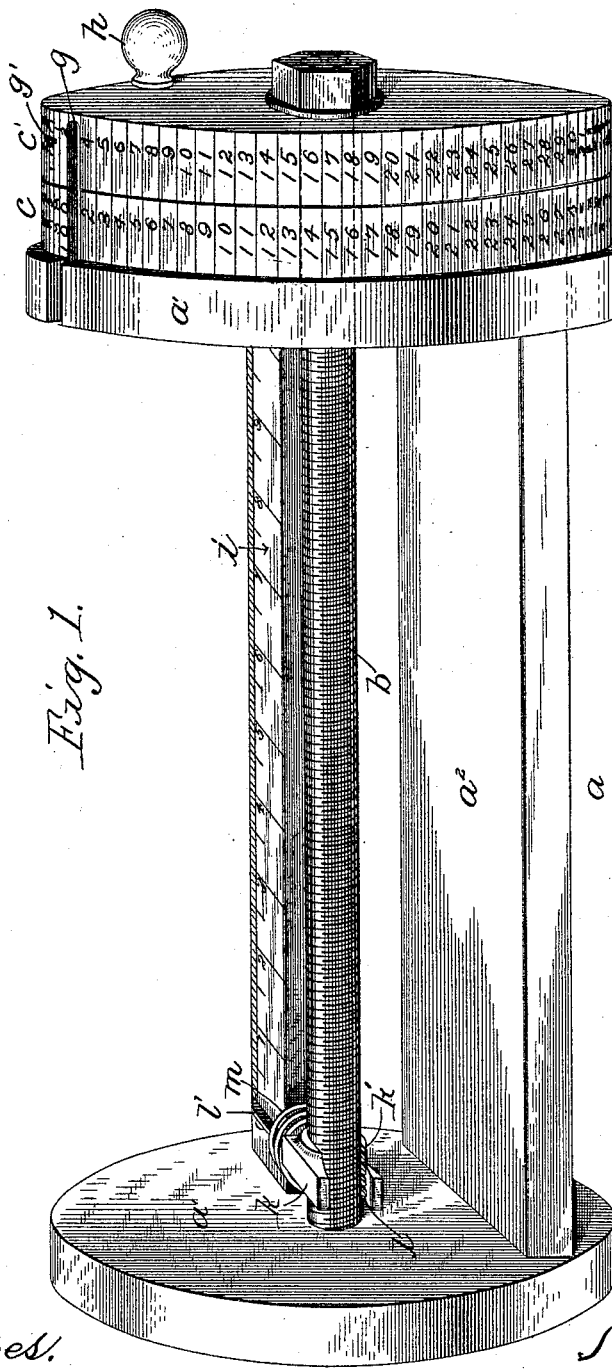
Figure 2:
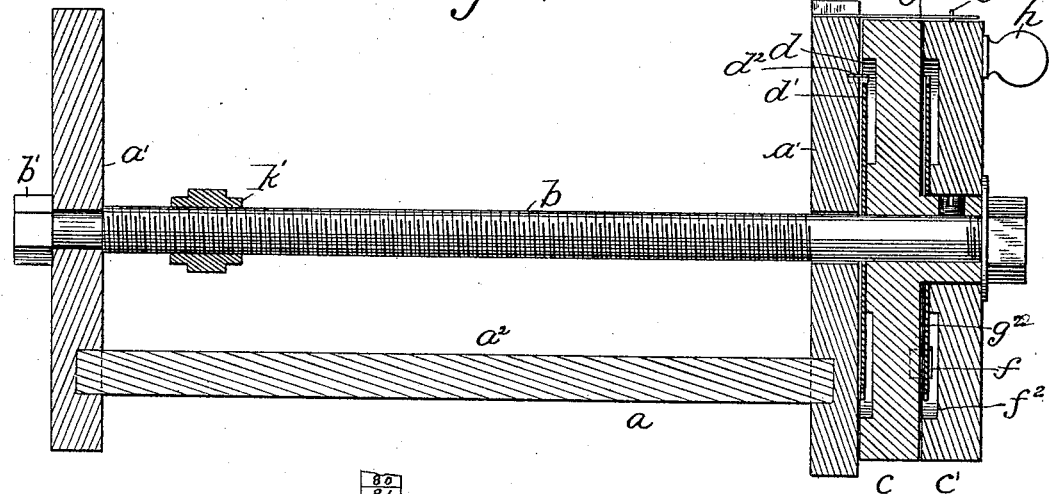
Figure 3:
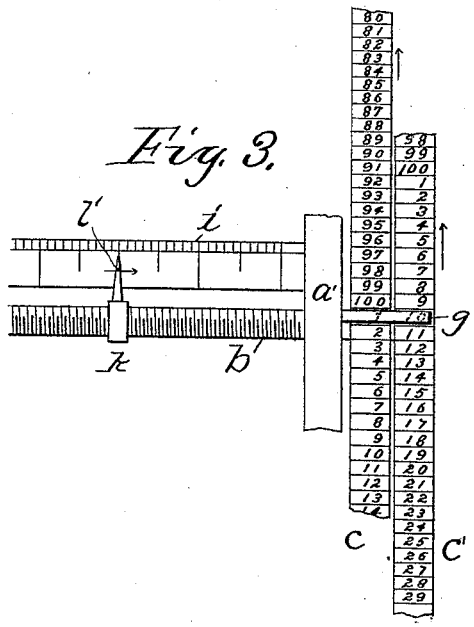
Figure 4:
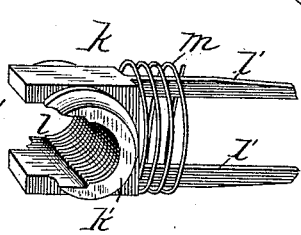

Referring to the drawings for a detailed description of the invention Figure 1 represents a perspective view thereof complete and in operative adjustment; Fig. 2, a longitudinal section; Fig. 3, a diagrammatical view; Fig. 4, a detail view in perspective of the indicator and the parts attending such, and Fig. 5 a view showing the pawl and ratchet connection between the several disks, portions being shown in dotted lines.

The adding mechanism is mounted on a rockable frame $a$ consisting of a pair of rollers $a'$ connected eccentrically by a righting bar $a^2$. The gravity of the bar will always keep the machine right side up as shown in Fig. 1. A pair of numbered disks $c$ and $c'$ are placed side by side on the right of the right hand roller $a'$ and are mounted upon a screw-threaded shaft $b$ which extends through the disks and rollers, and rotates freely in the latter. The disks are smaller in diameter than the rollers in order to raise them clear of the surface on which the rollers rest, and so that they will rotate freely during the operation of adding. The numbers on the peripheries of the disks are graduated from 1 to 100, and are adapted to co-operate with a graduated bar $i$, extending at right angles to the faces of the disks and bearing divisions numbered from 1 to 10, representing thousands. This bar lies parallel with the screw-threaded shaft $b$. A pointer $k$, is timed to travel over the bar in unison with the rotations of the disks $c$ and $c'$, and so as to advance and register one point on the bar for each complete rotation of the disks. This pointer consists of a pair of arms $l'$ adapted to pass astride the bar $i$. These arms project from a body portion $K'$, internally threaded to mesh with the thread on the shaft $b$. One side of the body portion $K'$ of the pointer is cut away or bifurcated to leave an open passage $l$ large enough to receive the shaft $b$ in the operation of pushing back and disengaging the body portion of the pointer from the shaft for the purpose of sliding the pointer back to the starting point on the bar $i$. It will be seen that the screw threads in said body portion extend only throughout a partial circle. Therefore a spring $m$ is interposed between the bar $i$, and the body portion of the pointer to hold the body portion in engagement with the threads of the shaft so that the pointer will be advanced when the shaft is rotated.

The disk $c$ is fixed to rotate with the shaft $b$ through the medium of a laterally extending sleeve $c^2$, and set screw $c^3$. The disk $c'$ rotates on this sleeve, and is retained thereon by a washer $c^4$ interposed between the nut on the shaft and the end of the sleeve.

Figure 5:
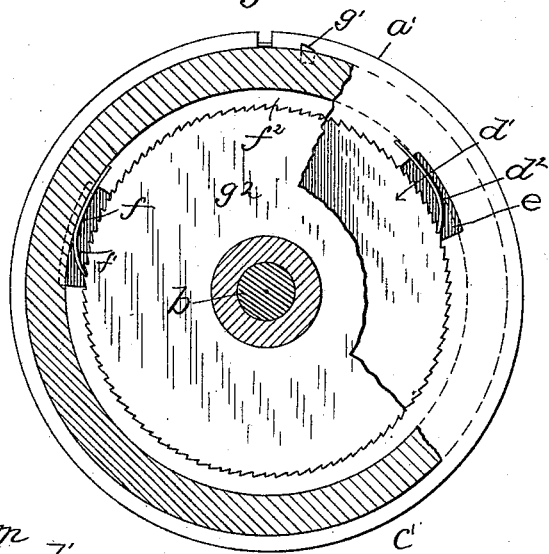

The disk $c$ has fixed to its left side a metallic ratchet disk $d'$, and the disk $c'$ is provided on its left side with a similar disk $g^2$, the teeth of the two disks being pitched in opposite directions as seen in Fig. 5. A spring pawl $d^2$ is attached to the roller $a'$, and its free end operates in the recess $e$, and engages the teeth of the disk $d'$ when the latter is moved backward but slides over them when the disk is moved forward. An oppositely disposed pawl $f$ attached to the disk $c$ and operating in a similar recess $f'$ engages the teeth of the disk $g^2$ so that it rotates freely in one direction, but in the other direction the two rotate together.

A detent $g'$ projects from the periphery of the disk $c'$ and comes in contact with a flexible arm $g$ attached to the top of the roller $a'$. This arm is the starting point, and the detent is shaped with an inclined surface which permits it to slide under and lift the arm when moved in one direction but is stopped by it when moved in the opposite direction.

In using my device the pointer $k$, is first set at the first point on the scale-bar as seen in Fig. 1 and the disks turned to bring the 100 point beneath the arm $g$. Supposing it is desired to add the numbers 10, 20, and 70; advance the wheels until figure 10 on disk $c'$ appears beneath the arm. Then turn the disk back until it is arrested by the detent $g'$. The disk $c$ is carried forward with the disk $c'$, but is held still by the pawl $d^2$ when the disk $c'$ is returned to the starting point. A second advance of the wheel $c'$ to bring the point 20 beneath the arm, and another return movement will cause the disk $c$ to register 30, the sum of the two numbers. If the disk $c'$ is now advanced to 70 and returned to the starting point, it will have caused the other disk to register a total of 100, and the pointer $k$ to advance one point on the scale-bar. This operation can be continued until the sum of ten thousand has been registered, and then by returning the pointer to the starting point at the left end of the bar, increased additions can be made.

The operation of disengaging the pointer to slide it back, can easily be performed by simply pressing it away from the threaded bar $b$, against the tension of the spring $m$, and sliding it to the starting point.

Having thus described my invention, what I claim as new, and desire to secure by Letters Patent, is—

1. In a machine for adding numbers, the combination of a rotatable screw-threaded shaft, a scale bar, a pointer advanced along the bar by the rotations of the shaft, a numbered disk secured to rotate with the shaft, and a second numbered disk rotating freely in one direction, but in the other the two disks rotate together, substantially as described.

2. In a machine for adding numbers, the combination of a rotatable screw-threaded shaft, a pointer engaged and advanced by the shaft, a numbered disk fixed thereon, a second loose disk, a pawl and ratchet connection between the disks whereby the loose disk is movable in one direction independently of the shaft and in the opposite direction with the shaft, substantially as described.

3. In an adding machine, the combination of a threaded shaft, a scale bar extending parallel therewith, a pointer advanced along the scale bar by the rotations of the shaft, a pair of numbered disks, one of which is fast and the other loose on the shaft, a pawl and ratchet mechanism, whereby the disks are rotated separately and together, and a detent device, substantially as described.

4. The combination of a pair of numbered disks fast and loose respectively upon a threaded rotatable shaft, a scale-bar, a pointer advanced along the scale-bar by the rotations of said shaft, a pair of supporting wheels, and a righting bar, substantially as described.

5. In an adding machine, and in combination with the scale-bar, a threaded shaft extending parallel with the bar, a pointer having a threaded portion in engagement with and actuated by the shaft, and having an open space communicating with said threaded portion, whereby the pointer can be disengaged from the shaft, and a spring interposed between the bar and pointer to hold the latter to the action of the shaft, in the manner and for the purpose set forth.

6. In an adding machine, the combination with supporting wheels, of a pair of rotatable numbered disks, having pawl and ratchet connections between them, a screw-threaded shaft on which the disks are centered, a pointer actuated by the threads on the shaft, a scale bar, a pair of supporting wheels, a righting bar, an arm attached to one of the supporting wheels, and projecting over the peripheries of the numbered disks, and a detent on one of the disks adapted to engage the arm, all arranged and adapted to operate as set forth.

In testimony whereof I affix my signature in presence of two witnesses.

HORACE D. HICKS.

Witnesses:
J. C. TRICKEY,
F. C. FEARON.